3,590,033
1α,2α - METHYLENE - 19 - NOR - TESTOSTERONE ETHERS AND 18-ALKYL HOMOLOGS THEREOF
Otto Engelfried, Hermann Steinbeck, and Rudolf Wiechert, Berlin, Germany, assignors to Schering AG, Berlin and Bergkamen, Germany
No Drawing. Filed Apr. 4, 1969, Ser. No. 815,259
Claims priority, application Germany, Apr. 5, 1968, P 17 68 161.7
Int. Cl. C07c 173/00
U.S. Cl. 260—239.55           5 Claims

ABSTRACT OF THE DISCLOSURE

1α,2α-methylene - 19 - nor-testosterone ethers and 18-alkyl homologs thereof characterized by favorable anabolic and minimal androgenic activity having the formula

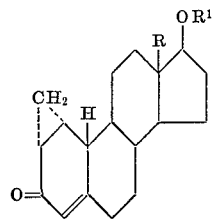

wherein R represents lower alkyl and $R^1$ is tetrahydropyranyl or alkyl containing 1 to 4 carbon atoms. The substituent R can be methyl, ethyl, propyl, i-propyl, butyl, pentyl, hexyl and the like.

This invention relates to 1α,2α-methylene-19-nor-testosterone ethers and 18-alkyl homologs thereof constituting valuable pharmaceutical agents and to methods of making and using the same.

The new and valuable ethers of 1α,2α-methylene-19-nor-testosterone and 18-alkyl homologs thereof, as they are produced according to the process of the present invention correspond to the following formula:

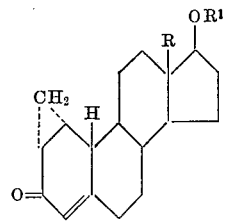

(I)

wherein R represents lower alkyl and $R^1$ is tetrahydropyranyl or alkyl containing 1 to 4 carbon atoms.

Said new compounds are obtained according to the process of the present invention by introducing in the known manner into the saturated A-ring of a 17β-alkoxy-1α,2α-methylene-3-ketosteroid, a $\Delta^4$-double bond or by etherifying the corresponding 17β-hydroxy-1α,2α-methylene-$\Delta^4$-3-ketosteroid with dihydropyran or an alkylating agent.

In preparing the new 17-ether compounds of the invention, there can be utilized as starting materials, substances which already contain the desired ether group in the 17-position and into which the $\Delta^4$-double bond is introduced. The introduction of the $\Delta^4$-double bond can be accomplished by known methods. For example the saturated A-ring of 1α,2α-methylene-3-ketosteroid can be dehydrated in the 4,5-position by chemical or microbiological means. Alternatively the $\Delta^4$-unsaturated compound can be obtained from the corresponding 4-halogen steroid by splitting off hydrogen halide. The 4-halogen steroid can be prepared by known methods from 1α,2α-methylene-3-ketone which in turn has been prepared from the corresponding 1α,2α-methylene-$\Delta^3$-3-enolacetate, by heating the 3-ketone with isopropenyl-acetate in the presence of p-toluene-sulfonic acid in benzene solution. The $\Delta^3$-double bond is then halogenated with bromine or chlorine to provide the 4-halogen-3-ketosteroid. The splitting off of hydrogenhalide takes place in the customary manner, for example by heating the 4-halogen compound in dimethylformamide, preferably in the presence of an alkali halogenide and an alkaline earth carbonate.

The reaction follows the following scheme:

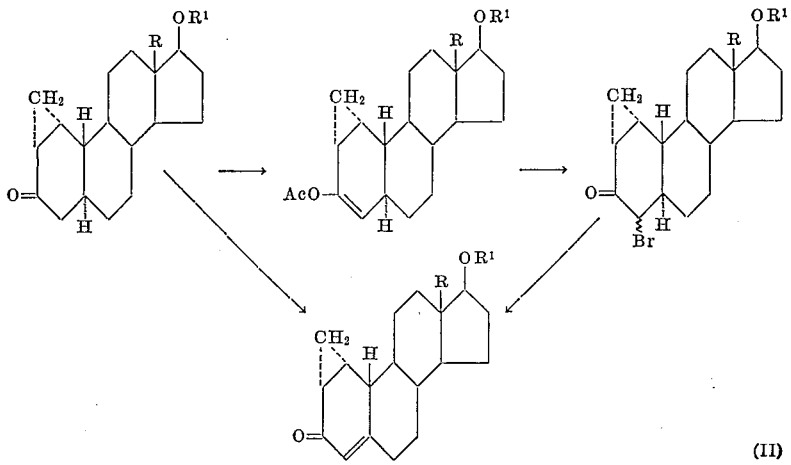

(II)

Another procedure for etherifying the free 17β-hydroxy-1α,2α-methylene-$\Delta^4$-3-ketosteroids to form the desired 17-ethers consists in reacting the 17-hydroxysteroid with dihydropyran in the presence of an acid such as p-toluene-sulfonic acid or phosphorous oxychloride to form the 17-tetrahydropyranyl ether. Alternatively the 17-hydroxysteroid can be reacted with an alkylating agent such as an alkylhalogenide, in the presence of a basic condensation agent in an inert solvent medium to thereby form the 17-alkyl ether. As basic condensation agent, there may be suitably used silver oxide.

The etherification takes place according to the following scheme:

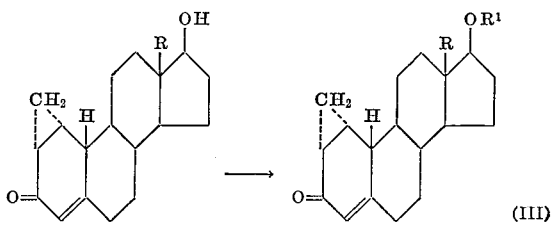

The unsaturated 17-tetrahydropyranyl ether is not very stable and in certain reactions, as for instance, those conducted in an acid reaction medium, undergoes splitting, so that it is advantageous that the ether group be introduced in the last step.

Thus, according to the invention most advantageously the 17-alkyl ethers are prepared so that the etherification of the free steroid takes place first, followed by the introduction of the $\Delta^4$-double bond in the last step.

The new ethers are valuable pharmaceutical agents. They are characterized by anabolic activity and through an especially favorable dissociation of the desired anabolic activity and the undesirable androgenic secondary effects.

The following table is given to demonstrate the anabolic and minimal androgenic activity of the compounds of the invention as exemplified by 17$\beta$-tetrahydropyranyl-oxy-1$\alpha$,2$\alpha$-methylene-4-estrene-3-one (I) and 17$\beta$ - methoxy-18-methyl-1$\alpha$,2-methylene - 4 - estrene-3-one (II) in comparison to the standard conventionally used 17-methyltestosterone (III). The data reported in the table were obtained using castrated male rats following oral administration of the test compounds in the amount indicated and employing the conventional anabolic androgen test procedures. As criterion for the anabolic activity, the levator-ani weight per 100 g. rat, and as criterion for the androgenic activity the seminal vesicle weight per 100 g. rat were used.

| Compound | Dose in mg. | Levator-ani wt. in mg. | Seminal vesicle in mg. |
| --- | --- | --- | --- |
| (I) 17$\beta$-tetrahydropyranyloxy-1$\alpha$,2$\alpha$-methylene-4-estrene-3-one | 3 | 37 | 23 |
| (II) 17$\beta$-methoxy-18-methyl-1$\alpha$,2$\alpha$-methylene-4-estrene-3-one | 3 | 26 | 18 |
| (III) 17$\alpha$-methyltestosterone | 3 | 24 | 40 |

It is evident from the table that the standard substance III does not have a strong anabolic activity and that further it does not have a favorable displacement of the therapeutic ratio due to its high androgenic activity.

The effectiveness of the compounds of the invention following oral administration was not to have been foreseen in that according to the prevailing opinion compounds having a free or functionally modified secondary hydroxyl group thusly administered would be expected to undergo a marked loss in activity due to enzymatic decomposition in the organism.

As a result, heretofore, for oral application, only androstane derivatives have been used which contained in the 17-position an additional methyl group. Although alkyl groups in the 17$\alpha$-position hindered the oxidative decomposition of a 17-permanent hydroxyl group when such a steroid was administered orally, such compounds were not therapeutically acceptable, as in their use as medicinals, i.e., the use of 17-alkylated steroids, resulted in liver disturbances. It is clear that a technical requirement of orally active anabolic compounds is that they not have this disadvantageous property.

The new 17-ethers of the invention are indicated for use whenever a promotion of protein rebuilding is desired. Such conditions include, convalescence, reduced well being, consuming diseases, cachectic conditions, X-ray and cytostatic therapy, anemias, following prolonged treatment with corticoids, osteoporosis, chronic liver and kidney disease and the like.

The doses to be administered vary according to the type and severity of the condition. Ordinarily the preparations should be administered in an amount of between 1 and 20 mg. per day.

The preparation of the compounds in a form adapted for oral administration takes place in the conventional manner. The ethers of the invention are admixed with suitable carriers, taste improvers, etc. and the mixtures prepared in the form of tablets, pills, dragees, or other compressed forms, or as powders filled into capsules, or also in liquid form, for instance as solutions, syrups, emulsions and the like.

Tablets can be prepared by combining the following and tableting in the conventional manner:

| | Mg. |
| --- | --- |
| 17$\beta$-tetrahydropyranyloxy - 1$\alpha$,2$\alpha$ - methylene-4-estrene-3-one (active agent) | 5.000 |
| Fillers: | |
| Milk sugar DAB 6 | 36.000 |
| Corn Starch USPXV1 | 71.565 |
| Talc DAB 6 | 6.000 |
| Gelatine | 1.400 |
| Preservatives: | |
| p-Oxybenzoic acid methyl-ester DAB 6.3 supplement | 0.024 |
| p-Oxybenzoic acid propyl-ester DAB 6.3 supplement | 0.011 |
| | 120.000 |

The following examples serve to illustrate the present invention without, however, limiting the same thereto.

The starting materials as used in the examples were prepared as follows:

(I) 17$\beta$-hydroxy-1$\alpha$,2$\alpha$-methylene-4-estrene-3-one

The preparation of 17$\beta$-hydroxy-1$\alpha$,2$\alpha$-methylene-4-estrene-3-one was carried out by the procedure set out in German Patent DBP 1,237,111 (U.S. patent application, Ser. No. 605,562).

(II) 17$\beta$-hydroxy-18-methyl-1$\alpha$,2$\alpha$-methylene-4-estrene-3-one 15 g. 17$\beta$ - hydroxy-18-methyl-4-estrene-3-one (Jour. Chem. Soc. 1964, 4472) were reduced with lithium in liquid ammonia to provide 7.8 g. 17$\beta$-hydroxy-18-methyl-5$\alpha$-estran-3-one having a melting point of 144–145° C. This latter compound was esterified with acetanhydride in pyridine. Bromination and subsequent dehydrobromination of the resultant 17$\beta$-acetoxy-18-methyl-5$\alpha$-estran-3-one produced 17$\beta$-acetoxy-18-methyl-5$\alpha$-estr-1-ene-3-one (melting point 120.5–122° C.) in 35% yield. This compound was treated with trimethylsulfoxonium iodide and sodium hydride in dimethylsulfoxide and resulted in a 32% yield of 17$\beta$-acetoxy-18-methyl-1$\alpha$,2$\alpha$-methylene-5$\alpha$-estran-3-one having a melting point of 149.5–150° C. The $\Delta^4$-double bond was introduced by converting the 1$\alpha$,2$\alpha$-methylene-5$\alpha$-H-3-ketone into the 3-enolacetate having a melting point of 100–103° C. and this compound brominated to the 4-brom-3-ketone. The 4-brom compound was heated under nitrogen in dimethylformamide in the presence of calcium carbonate and lithium bromide. There was thereby obtained 17$\beta$ - acetoxy - 18-methyl-1$\alpha$,2$\alpha$-methylene-4-estrene-3-one having a melting point of 119–121° C. (ether/hexane). The latter was converted into 17$\beta$ - hydroxy-18-methyl-1$\alpha$,2$\alpha$-methylene-4-estrene-3-one having a melting point of 235–242° C. by treatment with sodium methylate solution in tetrahydrofuran in the cold.

(III) 17$\beta$-methoxy-18-methyl-1$\alpha$,2$\alpha$-methylene-5$\alpha$-estran-3-one There were obtained from 3 g. 17$\beta$-acetoxy-18-methyl-1$\alpha$,2$\alpha$-methylene-5$\alpha$-estran-3 - one by treatment thereof with aqueous methanolic potassium carbonate solution, 2.5 g. 17β-hydroxy-18-methyl-1α,2α-methylene-5α-estran-3-one having a melting point of 216-218° C. (acetic ester). The 17β-hydroxy-18-methyl-1α,2α-methylene-5α-estran-3-one was etherified in 100 ml. benzene with 50 methyliodide and 10 g. silver oxide in four hours by heating under reflux. Following chromatography there were obtained 0.8 g. 17β - methoxy-18-methyl-1α,2α-methylene - 5α - estran - 3 - one having a melting point of 108-109° C.

(IV) 17β-methoxy-1α,2α-methylene-5α-estran-3-one 5.0 g. 17β-hydroxy-5α-estran-3-one (Jour. Amer. Chem. Soc. 80 (1958), 6115) were heated under reflux for 4.5 hours in 200 ml. benzene with 100 ml. methyliodide and 20 g. silver oxide. Following chromatography there were recovered 3.5 g. 17β-methoxy-5α-estran-3-one having a melting point of 127-129° C. Through bromination and dehydrobromination, the Δ¹-double bond was introduced into the 17β-methoxy-5α-estran-3-one. The resulting 17β-methoxy-5α-estr-1-ene-3-one having a melting point of 81.5-82° C. was treated with trimethylsulfoxonium iodide and sodium hydride in dimethylsulfoxide to form 17β-methoxy-1α,2α-methylene-5α-estran-3-one having a melting point of 88.5-90.5° C. (hexane).

EXAMPLE 1

A mixture of 1 g. 17β-hydroxy-1α,2α-methylene-4-estrene-3-one, 25 ml. tetrahydrofuran, 2.5 ml. dihydropyran and 0.02 ml. phosphoroxychloride was stirred for 2.5 hours at room temperature. The stirred mixture was then introduced under stirring into aqueous bicarbonate solution. The precipitated material was filtered off, washed and dried. The raw product was stirred up into pentane, separated by suction filtering and washed with a small amount of pentane. There were recovered 1.05 g. 17β-tetrahydropyranyloxy - 1α,2α-methylene-4-estrene-3-one having a melting point of 147-160° C.

UV: $\epsilon_{241}=13.600$

EXAMPLE 2

Using a procedure analogous to Example 1, 1.7 g. 17β-hydroxy-18-methyl-1α,2α-methylene-4-estrene-3-one were reacted with dihydropyran and further worked up. The viscous tetrahydropyranylether which separated out was taken up in methylenechloride, the solution washed, dried and concentrated. The residue was taken up in a small amount of ether and treated with hexane. There were recovered 1.4 g. 17β-tetrahydropyranyloxy-18-methyl-1α,2α-methylene-4-estrene-3-one having a melting point of 120-135° C.

UV: $\epsilon_{242}=14.000$

EXAMPLE 3

A mixture of 1.32 g. 17β-hydroxy-18-methyl-1α,2α-methylene-4-estrene-3-one, 53 ml. benzene, 2.6 ml. methyliodide and 5.3 g. silver oxide was heated for 2 hours up to boiling. The residue was separated off with suction. recovered residue was washed with benzene and heated together with hexane. The purified filtrate was then evaporated. Following purification by preparative thin layer chromatography, there was recovered 17β-methoxy-18-methyl-1α,2α-methylene-4-estrene-3-one having a melting point of 120-122° C. (hexane).

EXAMPLE 4

5 g. 17β - methoxy - 18-methyl-1α,2α-methylene-5α-estrane-3-one in 100 ml. abs. benzene and 600 mg. p-toluenesulfonic acid were heated up to boiling for 4 hours in the presence of 20 ml. isopropenylacetate. Following cooling to room temperature, the reaction mixture was diluted with acetic ester and the resultant solution washed consecutively with sodiumhydrogencarbonate solution and water. The solution was dried over sodium sulfate and evaporated. The residue was chromatographed on silica gel. There were recovered 4.3 g. 17β-methoxy-3-acetoxy-18-methyl-1α,2α-methylene-5α-estr-3-ene having a melting point of 106-109° C. Bromination was carried out by adding 1.9 g. enolacetate dissolved in 51 ml. carbon tetrachloride, followed by the addition of 0.25 ml. bromine in 5.1 ml. carbon tetrachloride and stirring for 5 minutes at room temperature. The resultant reaction mixture was diluted with acetic ester and the solution washed with dilute sodium hydrogencarbonate solution and water. The washed solution was dried over sodium sulfate, evaporated and the residue dehydrobrominated in 63 ml. dimethylformamide in the presence of 4.2 g. calcium carbonate and 2.1 g. lithium bromide by heating for 3 hours under nitrogen. The reaction mixture was filtered hot through a glass sinter suction filter, washed with hot dimethylformamide, concentrated under decreased pressure and poured into ice water. The isolated crude product was chromatographed over silica gel. There were thusly recovered 17β-methoxy-18-methyl-1α,2α-methylene-4-estrene-3-one that was identical to the product obtained in Example 3.

EXAMPLE 5

Using a procedure analogous to that of Example 3, there were recovered from 17β-hydroxy-1α,2α-methylene-4-estrene-3-one, methyliodide and silver oxide in benzene 17β - methoxy-1α,2α-methylene-4-estrene-3-one having a melting point of 127.5-129° C.

EXAMPLE 6

Analogously to Example 4, there was obtained from 17β-methoxy-1α,2α-methylene-5α-estrane-3-one via its 3-enolacetate having a melting point of 90-91° C. (hexane) through bromination and hydrogen bromide cleavage, 17β-methoxy-1α,2α-methylene-4-estrane-3-one which was identical with the compound obtained in Example 5.

We claim:
1. A member selected from the group consisting of 1α,2α-methylene-19-nor-testosterone ethers and the 18-alkyl homologs thereof corresponding to the formula:

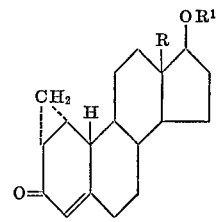

wherein R is lower alkyl and R¹ is a member selected from the group consisting of alkyl containing 1 to 4 carbon atoms and tetrahydropyranyl.

2. A compound according to claim 1 designated 17β-tetrahydropyranyloxy-1α,2α-methylene-4-estrene-3-one.

3. A compound according to claim 1 designated 17β-tetrahydropyranyloxy - 18 - methyl - 1α,2α-methylene-4-estrene-3-one.

4. A compound according to claim 1 designated 17β-methoxy-18-methyl-1α,2α-methylene-4-estrene-3-one.

5. A compound according to claim 1 designated 17β-methoxy-1α,2α-methylene-4-estrene-3-one.

References Cited

"Steroid Reactions," by Djerassi (1963), pp. 79 and 231 relied on.

ELBERT L. ROBERTS, Primary Examiner

U.S. Cl. X.R.
260—397.4; 424—243